(12) United States Patent
Daimon (10) Patent No.: US 12,473,906 B2
(45) Date of Patent: Nov. 18, 2025

(54) ELECTROCHEMICAL HYDROGEN COMPRESSION SYSTEM

(71) Applicant: HONDA MOTOR CO., LTD., Tokyo (JP)

(72) Inventor: Hayato Daimon, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 114 days.

(21) Appl. No.: 18/406,461

(22) Filed: Jan. 8, 2024

(65) Prior Publication Data

US 2024/0240628 A1 Jul. 18, 2024

(30) Foreign Application Priority Data

Jan. 13, 2023 (JP) ................................. 2023-003442

(51) Int. Cl.
*F04B 45/047* (2006.01)
*F17C 5/06* (2006.01)

(52) U.S. Cl.
CPC .............. *F04B 45/047* (2013.01); *F17C 5/06* (2013.01); *F17C 2221/012* (2013.01)

(58) Field of Classification Search
CPC ........ B60L 50/72; B60L 58/30; B60R 16/033; F04B 45/047; F17C 5/06; B60K 6/32
See application file for complete search history.

(56) References Cited

U.S. PATENT DOCUMENTS

| 2019/0173114 A1 | 6/2019 | Sakai et al. |
| 2021/0387140 A1 | 12/2021 | Onuma |
| 2022/0185665 A1 | 6/2022 | Daimon et al. |

FOREIGN PATENT DOCUMENTS

| CN | 109873182 A | 6/2019 |
| CN | 113994028 A | 1/2022 |
| CN | 114639852 A | 6/2022 |
| JP | 2022-094891 A | 6/2022 |

OTHER PUBLICATIONS

Office Action and Search Report dated Jun. 7, 2025 issued in the corresponding Chinese Patent Application No. 202410049379.9 with the English machine translation thereof.

*Primary Examiner* — Anthony Ayala Delgado
(74) *Attorney, Agent, or Firm* — Carrier, Shende & Associates P.C.; Joseph P. Carrier; Fulchand P. Shende

(57) ABSTRACT

An electrochemical hydrogen compression system is equipped with a supply pathway communicating with an anode side of a unit cell, a discharge pathway communicating with a cathode side of the unit cell, a hydrogen return pathway guiding hydrogen to the supply pathway from a downstream side of a gas-liquid separator in the discharge pathway, and a control device. In the case that the electrical value indicative of a voltage or a resistance exceeds a predetermined threshold value when electrical current of the hydrogen compression stack is of a predetermined value, the control device opens a hydrogen return valve disposed in the hydrogen return pathway.

7 Claims, 2 Drawing Sheets

FIG. 1

ELECTROCHEMICAL HYDROGEN COMPRESSION SYSTEM

CROSS-REFERENCE TO RELATED APPLICATIONS

This application is based upon and claims the benefit of priority from Japanese Patent Application No. 2023-003442 filed on Jan. 13, 2023, the contents of which are incorporated herein by reference.

BACKGROUND OF THE INVENTION

Field of the Invention

The present invention relates to an electrochemical hydrogen compression system.

Description of the Related Art

In recent years, research and development have been conducted on electrochemical hydrogen compression systems that contribute to energy efficiency in order to ensure that more people have access to affordable, reliable, sustainable and modern energy.

The electrochemical hydrogen compression system disclosed in JP 2022-094891 A includes an electrochemical hydrogen compression device that compresses hydrogen. The electrochemical hydrogen compression device is equipped with a hydrogen compression stack (hydrogen compression part), and an electrical power source device (power supply). The hydrogen compression stack is equipped with a unit cell containing an electrolyte membrane, an anode power feeder, and a cathode power feeder. The electrical power source device supplies an electrical current to the hydrogen pressure boosting stack, and thereby causes the hydrogen pressure boosting stack to generate high pressure hydrogen gas having a higher pressure than the hydrogen gas supplied to the hydrogen pressure boosting stack.

In JP 2022-094891 A, it is disclosed that, based on information regarding a humidified state of the electrolyte membrane, a discharge port of the hydrogen compression stack from which non-reacted hydrogen gas is discharged is regulated, and water vapor is retained in the unit cell to thereby place the electrolyte membrane in a satisfactorily humidified state.

SUMMARY OF THE INVENTION

However, when a large amount of water remains in the unit cell at the time of supplying an electrical current to the hydrogen compression stack, the water tends to be subject to electrolysis. When an oxygen gas generated by electrolysis is mixed with a hydrogen gas supplied to the hydrogen compression stack, there is a problem that a chemical reaction is caused depending on the concentration of the oxygen gas.

The present invention has the object of solving the aforementioned problem.

An aspect of the present invention is characterized by an electrochemical hydrogen compression system including a hydrogen compression stack provided with a unit cell including an electrolyte membrane, an anode, and a cathode, an electrical power source device configured to supply an electrical current to the unit cell and cause a high pressure hydrogen gas to generate on a cathode side of the unit cell, the high pressure hydrogen gas having a pressure higher than that of a hydrogen gas supplied to an anode side of the unit cell, a hydrogen supply source configured to supply the hydrogen gas to the hydrogen compression stack via a supply pathway, a gas-liquid separator provided in a discharge pathway communicating with the cathode side of the unit cell and configured to separate water in the high pressure hydrogen gas, a hydrogen return pathway configured to guide a dry high pressure hydrogen gas, which is the high pressure hydrogen gas from which the water is separated, to the supply pathway communicating with the anode side of the unit cell, from a downstream side of the gas-liquid separator in the discharge pathway, a hydrogen return valve provided in the hydrogen return pathway, a detector configured to detect an electrical value indicative of a voltage or a resistance of the hydrogen compression stack, and a control device configured to control the hydrogen return valve and the electrical power source device, wherein the control device includes one or more processors configured to execute computer-executable instructions stored in a memory, by the computer executable instructions being executed by the one or more processors, the control device closes the hydrogen return valve in a case that the electrical value does not exceed a predetermined threshold value when the electrical current is of a predetermined value, and opens the hydrogen return valve in a case that the electrical value exceeds the threshold value when the electrical current is of the predetermined value, to supply the dry high pressure hydrogen gas to the hydrogen compression stack via the supply pathway.

According to the above aspect, it is possible to reduce the amount of water remaining in the unit cell when the electrical current is supplied to the hydrogen compression stack. Therefore, the amount of oxygen gas, which is generated by electrolysis of water remaining in the unit cell, and is mixed into the hydrogen gas supplied to the hydrogen compression stack, can be reduced. As a result, the occurrence of a chemical reaction between the oxygen gas and the hydrogen gas can be suppressed.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
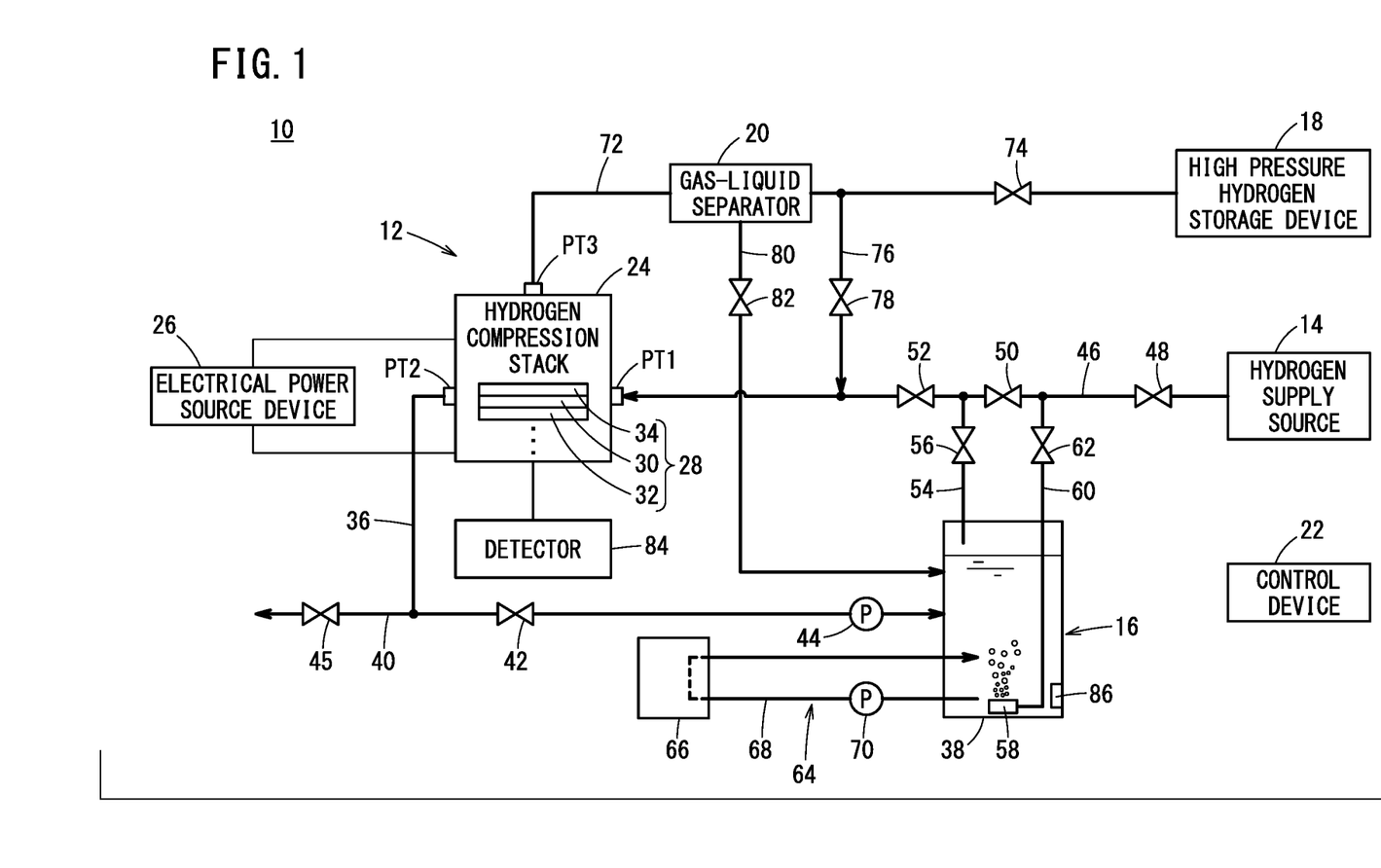
FIG. 1 is a schematic diagram showing an electrochemical hydrogen compression system.

FIG. 1 is a schematic diagram illustrating an electrochemical hydrogen compression system 10. The electrochemical hydrogen compression system 10 is provided with an electrochemical hydrogen compression device 12, a hydrogen supply source 14, a humidifier 16, a high pressure hydrogen storage device 18, a gas-liquid separator 20, and a control device 22.

The electrochemical hydrogen compression device 12 is a device that electrochemically compresses a hydrogen gas.

The electrochemical hydrogen compression device 12 includes a hydrogen compression stack 24 and an electrical power source device 26.

The hydrogen compression stack 24 includes an introduction port PT1, a discharge port PT2, and a high pressure hydrogen port PT3. The introduction port PT1 is a port for introducing the hydrogen gas, and communicates with an anode side of each of unit cells 28. The discharge port PT2 is a port for discharging a non-reacted hydrogen gas, and communicates with the anode side of each of the unit cells 28. The high pressure hydrogen port PT3 is a port for discharging a high pressure hydrogen gas generated in the unit cells 28, and communicates with a cathode side of each of the unit cells 28.

The plurality of unit cells 28 are each respectively of the same configuration. Each of the unit cells 28 includes an electrolyte membrane 30, an anode 32 provided on one surface of the electrolyte membrane 30, and a cathode 34 provided on another surface of the electrolyte membrane 30.

The electrolyte membrane 30, for example, is a solid polymer electrolyte membrane (cation ion exchange membrane). The electrolyte membrane 30 may be reinforced on the anode side thereof with a protective sheet (not shown) containing a fibrous skeletal framework. Further, for the electrolyte membrane 30, an HC (hydrocarbon) electrolyte can be used in addition to a fluorine electrolyte. The electrolyte membrane 30 is sandwiched between the anode 32 and the cathode 34.

The anode 32 includes an anode catalyst layer joined to one surface of the electrolyte membrane 30, and an anode power feeder laminated on the anode catalyst layer. The cathode 34 includes a cathode catalyst layer joined to another surface of the electrolyte membrane 30, and a cathode power feeder laminated on the cathode catalyst layer. The anode power supplying body and the cathode power supplying body are formed with a structure through which hydrogen gas is capable of flowing.

When an electrical current is supplied between the anode 32 and the cathode 34, a portion of the hydrogen gas supplied to the anode 32 from the introduction port PT1 is converted into protons (H+ ions) by a catalytic reaction. The converted protons are transported to the cathode 34 via the electrolyte membrane 30. At the cathode 34, a high pressure hydrogen gas is generated by an electrochemical reaction in which the transported protons are used. The high pressure hydrogen gas flows out from the high pressure hydrogen port PT3. The non-reacted hydrogen gas at the anode 32 flows out from the discharge port PT2.

The hydrogen gas that flows out from the exhaust port PT2 is supplied into a hermetically sealed container 38 via a low pressure discharge pathway 36, or alternatively, is exhausted through a vent pathway 40 that branches off from the low pressure discharge pathway 36. A discharge valve 42 and a pump 44 are disposed in the low pressure discharge pathway 36. A vent valve 45 is provided in the vent pathway 40. Each of the discharge valve 42 and the vent valve 45 opens or closes under the control of the control device 22. The pump 44 is driven under the control of the control device 22, and applies a flowing force to the hydrogen gas from an upstream side to a downstream side.

The electrical power source device 26 supplies an electrical current to the hydrogen compression stack 24. Consequently, a high pressure hydrogen gas, which has a higher pressure than the hydrogen gas supplied to the hydrogen compression stack 24, is generated in the hydrogen compression stack 24.

The electrical power source device 26 applies a voltage to the anode 32 and the cathode 34 of each of the unit cells 28, and thereby supplies the electrical current to the unit cells 28. Under the control of the control device 22, the electrical power source device 26 is configured to be capable of adjusting a magnitude of the electrical current supplied to each of the unit cells 28. As the electrical current supplied to the unit cells 28 becomes greater, the amount of the high pressure hydrogen gas generated in the unit cells 28 becomes more plentiful.

The hydrogen supply source 14 is a device that is capable of supplying hydrogen gas. The hydrogen supply source 14 may be a pallet on which a plurality of gas cylinders in which hydrogen gas is stored are gathered together, or a tank storing hydrogen gas. The hydrogen supply source 14 supplies the hydrogen gas to the hydrogen compression stack 24 via a supply pathway 46.

The supply pathway 46 is a pathway that guides the hydrogen gas from the hydrogen supply source 14 to the hydrogen compression stack 24. An upstream end of the supply pathway 46 is connected to a non-illustrated output port of the hydrogen supply source 14. A downstream end of the supply pathway 46 is connected to the introduction port PT1 of the hydrogen compression stack 24. The supply pathway 46 is provided with a pressure reducing valve 48, a hydrogen supply valve 50, and a flow rate adjustment valve 52 in this order from an upstream side to a downstream side.

Although there is one pressure reducing valve 48 shown in FIG. 1, two or more pressure reducing valves 48 may be provided. The hydrogen supply valve 50 opens or closes under the control of the control device 22. Under the control of the control device 22, the flow rate adjustment valve 52 adjusts the flow rate of the hydrogen gas supplied to the hydrogen compression stack 24.

The humidifier 16 is a device that serves to humidify the hydrogen gas. The humidifier 16 includes the hermetically sealed container 38. The humidifier 16 vaporizes liquid water that is stored in the hermetically sealed container 38. The humidifier 16 supplies the water vapor to the supply pathway 46 via an outlet pathway 54.

The outlet pathway 54 is a pathway that guides the water vapor from the humidifier 16 to the supply pathway 46. An upstream end of the outlet pathway 54 is arranged in a gas phase space of the hermetically sealed container 38. A downstream end of the outlet pathway 54 is connected to the supply pathway 46 between the hydrogen supply valve 50 and the flow rate adjustment valve 52. An outlet valve 56 is provided in the outlet pathway 54. The outlet valve 56 opens or closes under the control of the control device 22.

The humidifier 16 may be a bubbler type humidifier. In FIG. 1, an example is shown in which the humidifier 16 is a bubbler type humidifier. In this case, the humidifier 16 includes a bubble generator 58. According to the present embodiment, the bubble generator 58 is placed within the liquid water inside the hermetically sealed container 38. The bubble generator 58 releases the hydrogen gas supplied from the supply pathway 46 as bubbles into the liquid water via an inlet pathway 60. In this case, the hydrogen gas contains water (water vapor) therein. The hydrogen gas containing water is supplied to the supply pathway 46 via the outlet pathway 54.

The inlet pathway 60 is a pathway that guides a portion of the hydrogen gas flowing through the supply pathway 46 from the supply pathway 46 to the bubble generator 58. An upstream end of the inlet pathway 60 is connected to a location in the supply pathway 46 that is more upstream than a location to which the downstream end of the outlet pathway 54 is connected. A downstream end of the inlet pathway 60 is connected to the bubble generator 58. An inlet valve 62 is provided in the inlet pathway 60. The inlet valve 62 opens or closes under the control of the control device 22.

Moreover, a temperature adjustment device 64 that adjusts the temperature of the liquid water stored in the hermetically sealed container 38 may be provided. The temperature adjustment device 64 is equipped with a heat exchanger 66, a circulation pathway 68 that circulates between the heat exchanger 66 and the hermetically sealed container 38, and a pump 70 provided in the circulation pathway 68. The temperature adjustment device 64 drives the pump 70, and thereby causes the liquid water to circulate between the heat exchanger 66 and the hermetically sealed container 38 via the circulation pathway 68, and adjusts the temperature of the liquid water to a set temperature by undergoing heat exchange with the heat exchanger 66.

The high pressure hydrogen storage device 18 is a device that is formed to be capable of storing the high pressure hydrogen gas. The high pressure hydrogen storage device 18 may be a pallet on which a plurality of gas cylinders in which high pressure hydrogen gas is stored are gathered together, or a tank storing high pressure hydrogen gas. The high pressure hydrogen storage device 18 stores the high pressure hydrogen gas supplied from the hydrogen compression stack 24 via a discharge pathway 72. The discharge pathway 72 is a pathway that guides the high pressure hydrogen gas discharged from the hydrogen compression stack 24. An upstream end of the discharge pathway 72 is connected to the high pressure hydrogen port PT3 of the hydrogen compression stack 24. The downstream end of the discharge pathway 72 is connected to an input port (not shown) of the high pressure hydrogen storage device 18. A back pressure valve 74 is provided in the discharge pathway 72.

The gas-liquid separator 20 is disposed in the discharge pathway 72 between the back pressure valve 74 and the hydrogen compression stack 24. The gas-liquid separator 20 separates water in the high pressure hydrogen gas. The dry high pressure hydrogen gas, which is high pressure hydrogen gas from which the water has been separated, flows downstream of the discharge pathway 72. The dry high pressure hydrogen gas is supplied to the high pressure hydrogen storage device 18 via the discharge pathway 72 or alternatively, is supplied to the supply pathway 46 via a hydrogen return pathway 76 branching from the discharge pathway 72.

The hydrogen return pathway 76 is a pathway that guides the dry high pressure hydrogen gas to the supply pathway 46, from the downstream side of the gas-liquid separator 20 in the discharge pathway 72. The upstream end of the hydrogen return pathway 76 is connected to the discharge pathway 72. In the present embodiment, the upstream end of the hydrogen return pathway 76 is connected to the discharge pathway 72 between the gas-liquid separator 20 and the back pressure valve 74. The downstream end of the hydrogen return pathway 76 is connected to the supply pathway 46. In the present embodiment, the downstream end of the hydrogen return pathway 76 is connected to the supply pathway 46 between the flow rate adjustment valve 52 and the hydrogen compression stack 24. The hydrogen return pathway 76 is provided with a hydrogen return valve 78. The hydrogen return valve 78 opens or closes under the control of the control device 22.

The water separated by the gas-liquid separator 20 is supplied to the humidifier 16 via a water supply pathway 80.

The water supply pathway 80 is a pathway for supplying water from the gas-liquid separator 20 to the humidifier 16. The upstream end of the water supply pathway 80 is connected to a water discharge port (not shown) of the gas-liquid separator 20. The downstream end of the water supply pathway 80 is connected to a water introduction port (not shown) of the hermetically sealed container 38 of the humidifier 16. The water supply pathway 80 is provided with a water supply valve 82. The water supply valve 82 is opened or closed under the control of the control device 22.

The control device 22 is a computer that controls the electrochemical hydrogen compression system 10. The control device 22 is constituted by one or more processors and a storage medium. The storage medium may be constituted by a volatile memory and a nonvolatile memory. As the processor, there may be cited a CPU, an MCU, or the like. As the volatile memory, for example, there may be cited a RAM or the like. As the nonvolatile memory, for example, there may be cited a ROM, a flash memory, or the like.

A detector 84 is connected to the control device 22. The control device 22, using the detector 84, acquires an electrical value of the hydrogen compression stack 24 in the case that the electrical current of the hydrogen compression stack 24 is of a predetermined value. The electrical value is a value indicating a voltage or a resistance. A relationship is defined such that, as the voltage of the hydrogen compression stack 24 becomes higher as compared with a reference voltage, which is a voltage suitable for driving the hydrogen compression stack 24, the water remaining in the unit cells 28 becomes more plentiful. Similarly, a relationship is defined such that, as the resistance of the hydrogen compression stack 24 becomes higher as compared with a reference resistance, which is a resistance suitable for driving the hydrogen compression stack 24, the water remaining in the unit cells 28 becomes more plentiful. Therefore, by acquiring the electrical value in the case that the electrical current of the hydrogen compression stack 24 is of the predetermined value, the control device 22 is capable of determining the amount of the water remaining in the unit cells 28.

The detector 84 is provided in the hydrogen compression stack 24. The detector 84 may be a voltage sensor. In this case, the control device 22 acquires, as an electrical value, a voltage value (detected voltage value) detected by the voltage sensor in the case that the electrical current of the hydrogen compression stack 24 is of the predetermined value. The detector 84 may be a resistance sensor. In this case, the control device 22 acquires, as an electrical value, a resistance value (detected resistance value) detected by the resistance sensor in the case that the electrical current of the hydrogen compression stack 24 is of the predetermined value.

The voltage or the resistance may be calculated using Ohm's law. Therefore, using the value detected by the detector 84, the control device 22 may calculate the detected voltage value or the detected resistance value.

The detected voltage value may be a voltage value applied to both ends of the plurality of unit cells 28 provided in the hydrogen compression stack 24. Alternatively, the detected voltage value may be a voltage value of one of the unit cells 28 selected from among the plurality of unit cells 28. Alternatively, the detected voltage value may be a statistical value of the respective voltage values of the plurality of unit cells 28. Alternatively, the detected voltage value may be a statistical value of the voltage values of two or more of the unit cells 28 selected from among the plurality of unit cells 28. As the statistical value, for example, there may be cited an average value, a median value, or a total value.

Similarly, the detected resistance value may be a resistance value detected at both ends of the plurality of unit cells 28 provided in the hydrogen compression stack 24. Alternatively, the detected resistance value may be a resistance value of one of the unit cells 28 selected from among the plurality of unit cells 28. Alternatively, the detected resistance value may be a statistical value of respective resistance values of the plurality of unit cells 28. Alternatively, the detected resistance value may be a statistical value of the resistance values of two or more of the unit cells 28 selected from among the plurality of unit cells 28. As the statistical value, for example, there may be cited an average value, a median value, or a total value.

When the control device 22 receives an operation command, the control device 22 places the hydrogen compression stack 24 in an operating state. In this case, the control device 22 opens the hydrogen supply valve 50 to supply hydrogen gas from the hydrogen supply source 14 to the hydrogen compression stack 24. Further, the control device 22 controls the electrical power source device 26 and thereby applies a predetermined voltage to the hydrogen compression stack 24, and supplies the electrical current to the hydrogen compression stack 24. An electrochemical reaction is carried out in each of the unit cells 28 of the hydrogen compression stack 24 based on the hydrogen gas supplied from the hydrogen supply source 14. Consequently, the high pressure hydrogen gas is generated on the cathode side of each of the unit cells 28.

During the operation of the hydrogen compression stack 24, the control device 22 drives the pump 44, opens the discharge valve 42, and supplies the non-reacted hydrogen gas in the hydrogen compression stack 24 to the hermetically sealed container 38. Further, the control device 22 opens the vent valve 45 at a certain timing, and causes the hydrogen gas to be exhausted.

During the operation of the hydrogen compression stack 24, based on a target generation amount of the high pressure hydrogen gas, the control device 22 controls an opening of the flow rate adjustment valve 52 (the degree to which the flow rate adjustment valve 52 is opened), and thereby adjusts the flow rate of the hydrogen gas supplied to the hydrogen compression stack 24.

During the operation of the hydrogen compression stack 24, the control device 22 compares the water level of the liquid water stored in the hermetically sealed container 38 with a predetermined water level threshold value, with a predetermined period. The water level of the liquid water stored in the hermetically sealed container 38 is detected by a water level sensor 86 provided in the hermetically sealed container 38. When the liquid water level exceeds the water level threshold value, the control device 22 closes the water supply valve 82. On the other hand, when the liquid water level becomes lower than the water level threshold value, the control device 22 opens the water supply valve 82. The control device 22 may open the water supply valve 82 until the liquid water level exceeds the water level threshold value. Alternatively, the control device 22 may open the water supply valve 82 until a predetermined period of time elapses after the liquid water level becomes lower than the water level threshold value.

During the operation of the hydrogen compression stack 24, the control device 22 opens the inlet valve 62 and the outlet valve 56, and introduces water vapor into the supply pathway 46 together with hydrogen gas. Consequently, the control device 22 humidifies the hydrogen gas supplied to the hydrogen compression stack 24. In this case, the control device 22 may control at least one of the opening of the hydrogen supply valve 50 or the opening of the inlet valve 62 to adjust the flow rate ratio between the hydrogen gas flowing through the humidifier 16 and the hydrogen gas not flowing through the humidifier 16.

When the amount by which the hydrogen gas is humidified is increased, water tends to remain in the unit cells 28. The more plentiful water remains in the unit cells 28, the higher the voltage applied to the hydrogen compression stack 24 becomes.

In the present embodiment, when the operation of the hydrogen compression stack 24 is started, the control device 22 closes the hydrogen return valve 78, and thereafter compares the electrical value when the electrical current of the hydrogen compression stack 24 is of a predetermined value, with a predetermined threshold value, at each predetermined period. When the electrical value of the hydrogen compression stack 24 exceeds the threshold value in the case that the electrical current of the hydrogen compression stack 24 is of the predetermined value, the control device 22 executes a process of suppressing the water remaining in the unit cells 28 (water retention suppression process).

Figure 2:
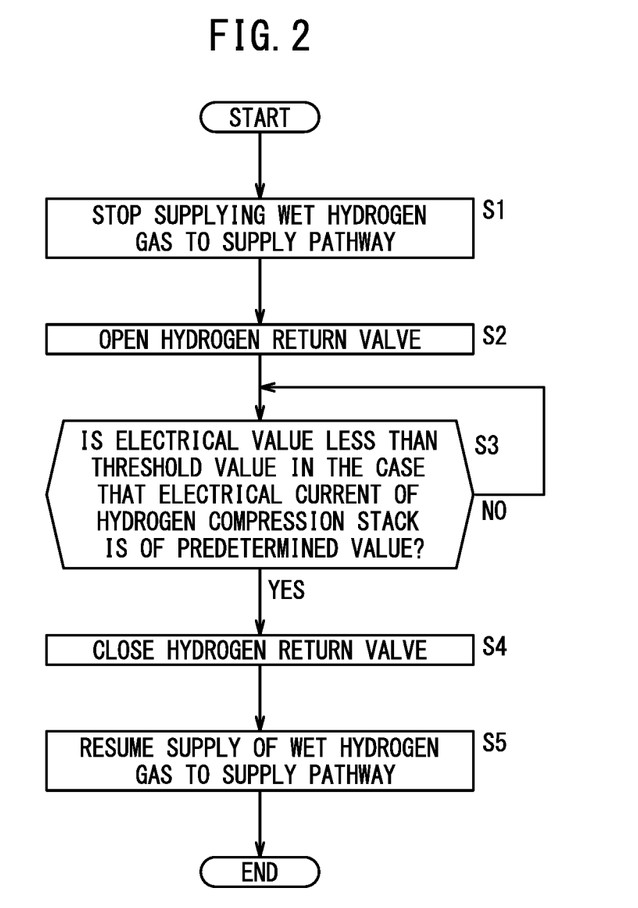
FIG. 2 is a flowchart showing the procedure of a water retention suppression process.

The water retention suppression process may be defined by a program. Alternatively, the water retention suppression process may be implemented by an integrated circuit such as an ASIC or an FPGA. Alternatively, the water retention suppression process may be implemented by an electronic circuit that includes a discrete device. FIG. 2 is a flowchart showing the procedure of a water retention suppression process.

In step S1, after closing the inlet valve 62 and the outlet valve 56, the control device 22 transitions to step S2. When the inlet valve 62 and the outlet valve 56 are closed, the supply of the hydrogen gas containing water vapor to the supply pathway 46 is stopped. Therefore, the hydrogen gas output from the hydrogen supply source 14 is supplied to the hydrogen compression stack 24 without being humidified by the humidifier 16.

In step S2, after opening the hydrogen return valve 78, the control device 22 transitions to step S3. When the hydrogen return valve 78 is opened, the dry high pressure hydrogen gas, which is the high pressure hydrogen gas from which the water is separated by the gas-liquid separator 20, is supplied from the discharge pathway 72 to the supply pathway 46 by the pressure difference between the discharge pathway 72 and the supply pathway 46. The dry high pressure hydrogen gas supplied to the supply pathway 46 is supplied to the hydrogen compression stack 24 together with the hydrogen gas output from the hydrogen supply source 14.

In step S3, the control device 22, using the detector 84, acquires the electrical value in the case that the electrical current of the hydrogen compression stack 24 is of the predetermined value, and compares the acquired electrical value with a predetermined threshold value. When the electrical value still exceeds the predetermined threshold value in the case that the electrical current of the hydrogen compression stack 24 is of the predetermined value, the control device 22 determines that water still remains in the hydrogen compression stack 24. In this case, the control device 22 remains at step S3. On the other hand, when the electrical value is less than the predetermined threshold value in the case that the electrical current of the hydrogen compression stack 24 is of the predetermined value, the control device 22 determines that there is almost no water remaining in the hydrogen compression stack 24. In this case, the control device 22 transitions to step S4.

In step S4, the control device 22 closes the hydrogen return valve 78, and thereby causes the supply of the dry high pressure hydrogen gas to the hydrogen compression stack 24 to be stopped. Thereafter, the control device 22 transitions to step S5.

In step S5, the control device 22 opens the inlet valve 62 and the outlet valve 56, and thereby resumes the supply of the hydrogen gas containing water vapor to the supply pathway 46. Thereafter, the control device 22 terminates the water retention suppression process.

As described above, in the present embodiment, the hydrogen return pathway 76 is provided between the discharge pathway 72 communicating with the cathode side of the unit cells 28 and the supply pathway 46 communicating with the anode side of the unit cells 28. The hydrogen return pathway 76 guides the dry high pressure hydrogen gas to the supply pathway 46 from the downstream side of the gas-liquid separator 20 in the discharge pathway 72.

During the operation of the hydrogen compression stack 24, when the electrical value does not exceed the predetermined threshold value when the current of the hydrogen compression stack 24 is of the predetermined value, the control device 22 closes the hydrogen return valve 78 provided in the hydrogen return pathway 76.

On the other hand, when the electrical value exceeds the predetermined threshold value when the electrical current of the hydrogen compression stack 24 is of the predetermined value, the control device 22 opens the hydrogen return valve 78 to supply the dry high pressure hydrogen gas from the discharge pathway 72 to the hydrogen compression stack 24 via the supply pathway 46.

As a result, the discharge pathway 72 and the supply pathway 46 communicate with each other, and the pressure of the cathode side of the unit cells 28 is reduced. Therefore, the dry high pressure hydrogen gas can be supplied to the hydrogen compression stack 24 via the supply pathway 46 due to the pressure difference between the discharge pathway 72 and the supply pathway 46. Therefore, the water remaining in the unit cells 28 can be moved to the cathode side of the unit cells 28. In addition, by the hydrogen gas supplied from the hydrogen supply source 14 to the hydrogen compression stack 24, the water content remaining in the unit cells 28 can be discharged from the cathode side of the unit cells 28 to the discharge pathway 72. Further, since the dry high pressure hydrogen gas from which the water is separated by the gas-liquid separator 20 is supplied to the hydrogen compression stack 24, the water remaining in the unit cells 28 can be discharged early and the hydrogen gas can be efficiently utilized. Therefore, the amount of oxygen gas that is generated by electrolysis of water remaining in the unit cells 28 and is mixed into the hydrogen gas supplied to the hydrogen compression stack 24 can be reduced. As a result, the occurrence of a chemical reaction between the oxygen gas and the hydrogen gas can be suppressed.

Further, since the dry high pressure hydrogen gas can be supplied to the hydrogen compression stack 24 via the supply pathway 46 due to the pressure difference between the discharge pathway 72 and the supply pathway 46, a pump need not be provided in the hydrogen return pathway 76 or the like. Therefore, the amount of water remaining in the unit cells 28 can be reduced while suppressing an increase in the number of components in the electrochemical hydrogen compression system 10.

Further, since the water in the unit cells 28 discharged from the cathode side of the unit cells 28 to the discharge pathway 72 can be separated by the gas-liquid separator 20, it is possible to suppress the water from returning again through the hydrogen return pathway 76.

In the present embodiment, when the electrical value exceeds the predetermined threshold value in the case that the electrical current of the hydrogen compression stack 24 is of the predetermined value, the control device 22 closes the inlet valve 62 and the outlet valve 56 to stop the supply of the water vapor to the supply pathway 46. Consequently, the reduction amount of the water remaining in the unit cells 28 can be increased, as compared with the case that the supply of the water vapor to the supply pathway 46 is not stopped.

In the present embodiment, the water supply pathway 80 is provided for guiding the water separated by the gas-liquid separator 20 from the gas-liquid separator 20 to the hermetically sealed container 38 of the humidifier 16. This makes it possible to improve the efficiency with which water is used.

In the present embodiment, when the water level of the liquid water in the hermetically sealed container 38 exceeds the water level threshold value, the control device 22 closes the water supply valve 82 provided in the water supply pathway 80. On the other hand, when the water level of the liquid water in the hermetically sealed container 38 becomes lower than the water level threshold value, the control device 22 opens the water supply valve 82. Consequently, it is possible to maintain the amount of water stored in the hermetically sealed container 38 at a certain level or more. As a result, it is possible to prevent the hydrogen gas flowing through the supply pathway 46 from being insufficiently humidified.

The above-described embodiment can be modified in the following manner.

(Modification 1)

The control device 22 may control at least one of the opening of the hydrogen return valve 78 (the degree to which the hydrogen return valve 78 is opened) or the magnitude of the electrical current supplied to the unit cells 28, to make the supply amount of the dry high pressure hydrogen gas larger than the generation amount of the high pressure hydrogen gas. Consequently, it is possible to increase the speed of a reduction in pressure on the cathode side of the unit cells 28. Therefore, the water remaining in the unit cells 28 can be discharged from the cathode side of the unit cells 28 to the discharge pathway 72 earlier than in the case that the speed of a reduction in pressure on the cathode side of the unit cells 28 is not increased.

The supply amount of the dry high pressure hydrogen gas is the amount of the dry high pressure hydrogen gas per unit time supplied from the hydrogen return valve 78 to the supply pathway 46. The generation amount of the high pressure hydrogen gas is the amount of the high pressure hydrogen gas per unit time generated in each of the unit cells 28 of the hydrogen compression stack 24.

The larger the opening of the hydrogen return valve 78 becomes, the larger the supply amount of the dry high pressure hydrogen gas becomes. Similarly, the larger the magnitude of the electrical current supplied to the unit cells 28 becomes, the larger the generation amount of the high pressure hydrogen gas becomes. Therefore, the control device 22 can make the supply amount of the dry high pressure hydrogen gas larger than the generation amount of the high pressure hydrogen gas, by making the opening of the hydrogen return valve 78 larger than the present value. Similarly, the control device 22 can make the supply amount of the dry high pressure hydrogen gas larger than the generation amount of the high pressure hydrogen gas, by making the magnitude of the electrical current supplied to the unit cells 28 smaller than the present value.

For example, the control device 22 calculates the generation amount of high pressure hydrogen gas corresponding to the magnitude of the electrical current presently supplied to the unit cells 28. Thereafter, the control device 22 calculates the opening of the hydrogen return valve 78 capable of supplying the dry high pressure hydrogen gas larger than the calculated generation amount of the high pressure hydrogen gas, and controls the hydrogen return valve 78.

Otherwise, for example, the control device 22 calculates the supply amount of dry high pressure hydrogen gas corresponding to the present opening of the hydrogen return valve 78. Thereafter, the control device 22 calculates the magnitude of the electrical current that can generate the high pressure hydrogen gas by the amount that is smaller than the calculated supply amount of the dry high pressure hydrogen gas, and controls the electrical power source device 26.

The control device 22 may store a first table showing the relationship between the opening of the hydrogen return valve 78 and the amount of the dry high pressure hydrogen gas supplied from the hydrogen return valve 78 to the supply pathway 46 per unit time. The control device 22 may store a second table showing the relationship between the magnitude of the electrical current supplied to the unit cells 28 and the amount of the high pressure hydrogen gas generated in the hydrogen compression stack 24 per unit time.

The opening of the hydrogen return valve 78, which can be controlled by the control device 22, may be zero. When the opening of the hydrogen return valve 78 is zero, it means that the hydrogen return valve 78 is closed. The hydrogen return valve 78 provided in the hydrogen return pathway 76 may be constituted by a flow rate adjustment valve and a pressure reducing valve (on-off valve) disposed downstream of the flow rate adjustment valve.
(Modification 2)

When the electrical value exceeds the predetermined threshold value in the case that the electrical current of the hydrogen compression stack 24 is the predetermined value, the control device 22 need not necessarily close the inlet valve 62 and the outlet valve 56. In this case, the control device 22 may control the openings of the inlet valve 62 and the outlet valve 56 (the degree to which the inlet valve 62 is opened and the degree to which the outlet valve 56 is opened) to reduce the amount of water vapor supplied from the humidifier 16 to the supply pathway 46. For example, in the case that the electrical value exceeds the predetermined threshold value when the electrical current of the hydrogen compression stack 24 is of the predetermined value, the control device 22 reduces the supply amount of the water vapor as compared with the case that the electrical value is less than the threshold value. Consequently, the reduction amount of the water remaining in the unit cells 28 can be increased, as compared with the case that the supply amount of the water vapor is not reduced.
(Modification 3)

The bubble generator 58, the inlet pathway 60, and the inlet valve 62 may be excluded from the electrochemical hydrogen compression system 10. Even without providing the bubble generator 58, the inlet pathway 60, and the inlet valve 62, the hydrogen gas flowing through the supply pathway 46 can still be humidified. Accordingly, even without providing the bubble generator 58, the inlet pathway 60, and the inlet valve 62, the same advantageous effects as those of the above-described embodiment can be obtained.
(Modification 4)

The gas-liquid separator 20 may be provided above the hermetically sealed container 38. In this case, water can be easily supplied from the gas-liquid separator 20 to the hermetically sealed container 38 even without installing a pump in the water supply pathway 80 or the like.
(Modification 5)

When the opening of the hydrogen return valve 78 is not adjusted, the hydrogen return valve 78 may be a three-way valve.
(Modification 6)

In the case that the capacity of the hermetically sealed container 38 is large, or the hermetically sealed container 38 is provided with a mechanism for discharging water, the water supply valve 82 need not necessarily be provided. That is, the water supply valve 82 is not indispensable.

Hereinafter, a description will be given concerning the inventions and the advantageous effects that are capable of being grasped from the description provided above.

(1) The present invention is characterized by the electrochemical hydrogen compression system (10) equipped with the hydrogen compression stack (24) provided with the unit cell (28) including the electrolyte membrane (30), the anode (32), and the cathode (34), the electrical power source device (26) configured to supply the electrical current to the unit cell and cause the high pressure hydrogen gas to generate on the cathode side of the unit cell, the high pressure hydrogen gas having the pressure higher than that of the hydrogen gas supplied to the anode side of the unit cell, and the hydrogen supply source (14) configured to supply the hydrogen gas to the hydrogen compression stack via the supply pathway (46). The electrochemical hydrogen compression system is provided with the gas-liquid separator (20) provided in the discharge pathway (72) communicating with the cathode side of the unit cell and configured to separate the water in the high pressure hydrogen gas, the hydrogen return pathway (76) configured to guide the dry high pressure hydrogen gas, which is the high pressure hydrogen gas from which the water is separated, to the supply pathway communicating with the anode side of the unit cell, from the downstream side of the gas-liquid separator in the discharge pathway, the hydrogen return valve (78) provided in the hydrogen return pathway, the detector (84) configured to detect the electrical value indicative of the voltage or the resistance of the hydrogen compression stack, and the control device (22) configured to control the hydrogen return valve and the electrical power source device. The control device closes the hydrogen return valve in the case that the electrical value does not exceed the predetermined threshold value when the electrical current is of the predetermined value, and opens the hydrogen return valve in the case that the electrical value exceeds the threshold value when the electrical current is of the predetermined value, to supply the dry high pressure hydrogen gas to the hydrogen compression stack via the supply pathway.

Consequently, it is possible to supply the dry high pressure hydrogen gas from the anode side of the unit cell toward the cathode side of the unit cell while reducing the pressure on the cathode side of the unit cell. Therefore, the water remaining in the unit cell can be discharged from the cathode side of the unit cell to the discharge pathway. As a result, the amount of water remaining in the unit cell can be reduced in a state in which electrical current is supplied to the hydrogen compression stack.

(2) In the present invention which is characterized by the Electrochemical hydrogen compression system according to the above-described item (1), the control device may control the degree to which the hydrogen return valve is opened, so as to make the supply amount of the dry high pressure hydrogen gas larger than the generation amount of the high pressure hydrogen gas. Consequently, it is possible to increase the speed of a reduction in pressure on the cathode side of the unit cell. Compared with the case that the speed of a reduction in pressure on the cathode side of the unit cell is not increased, the water remaining in the unit cell can be discharged from the cathode side of the unit cell to the discharge pathway at an early stage.

(3) In the present invention which is characterized by the electrochemical hydrogen compression system according to the above-described item (1) or (2), the control device may control the magnitude of the electrical current supplied to the unit cell, so as to make the supply amount of the dry high pressure hydrogen gas larger than the generation amount of the high pressure hydrogen gas. Consequently, it is possible to increase the speed of a reduction in pressure on the cathode side of the unit cell. Compared with the case that the speed of a reduction in pressure on the cathode side of the unit cell is not increased, the water remaining in the unit cell can be discharged from the cathode side of the unit cell to the discharge pathway at an early stage.

(4) In the present invention which is characterized by the electrochemical hydrogen compression system according to the above-described item (1), there may further be provided the humidifier (16) configured to supply water vapor to the supply pathway via the outlet pathway (54), and the outlet valve (56) provided in the outlet pathway and controlled by the control device, wherein in the case that the electrical value exceeds the threshold value when the electrical current is of the predetermined value, the control device may control the degree to which the outlet valve is opened to reduce the amount of the water vapor supplied from the humidifier to the supply pathway, as compared with the case that the electrical value is less than the threshold when the electrical current is of the predetermined value. Consequently, the reduction amount of the water remaining in the unit cell can be increased, as compared with the case that the supply amount of the water vapor is not reduced.

(5) In the present invention which is characterized by the electrochemical hydrogen compression system according to the above-described item (1), there may further be provided the humidifier configured to supply the water vapor to the supply pathway via the outlet pathway, the outlet valve provided in the outlet pathway and controlled by the control device, wherein in the case that the electrical value exceeds the threshold value when the electrical current is of the predetermined value, the control device may close the outlet valve and stop the supply of the water vapor to the supply pathway. Consequently, the reduction amount of the water remaining in the unit cell can be increased, as compared with the case that the supply of the water vapor is not stopped.

(6) In the present invention which is characterized by the electrochemical hydrogen compression system according to the above-described item (4) or (5), there may further be provided the water supply pathway (80) configured to guide the water separated by the gas-liquid separator to the humidifier, from the gas-liquid separator. This makes it possible to improve the efficiency with which water is used.

It should be noted that the present invention is not limited to the disclosure described above, and various additional or alternative configurations could be adopted therein without departing from the essence and gist of the present invention.

The invention claimed is:
1. An electrochemical hydrogen compression system comprising:
    a hydrogen compression stack provided with a unit cell including an electrolyte membrane, an anode, and a cathode;
    an electrical power source device configured to supply an electrical current to the unit cell and cause a high pressure hydrogen gas to generate on a cathode side of the unit cell, the high pressure hydrogen gas having a pressure higher than that of a hydrogen gas supplied to an anode side of the unit cell;
    a hydrogen supply source configured to supply the hydrogen gas to the hydrogen compression stack via a supply pathway;
    a gas-liquid separator provided in a discharge pathway communicating with the cathode side of the unit cell and configured to separate water in the high pressure hydrogen gas;
    a hydrogen return pathway configured to guide a dry high pressure hydrogen gas, which is the high pressure hydrogen gas from which the water is separated, to the supply pathway communicating with the anode side of the unit cell, from a downstream side of the gas-liquid separator in the discharge pathway;
    a hydrogen return valve provided in the hydrogen return pathway;
    a detector configured to detect an electrical value indicative of a voltage or a resistance of the hydrogen compression stack; and
    a control device configured to control the hydrogen return valve and the electrical power source device;
    wherein the control device comprises one or more processors configured to execute computer-executable instructions stored in a memory,
    by the computer executable instructions being executed by the one or more processors, the control device closes the hydrogen return valve in a case that the electrical value does not exceed a predetermined threshold value when the electrical current is of a predetermined value, and opens the hydrogen return valve in a case that the electrical value exceeds the threshold value when the electrical current is of the predetermined value, to supply the dry high pressure hydrogen gas to the hydrogen compression stack via the supply pathway.

2. The electrochemical hydrogen compression system according to claim 1, wherein the control device controls a degree to which the hydrogen return valve is opened, so as to make a supply amount of the dry high pressure hydrogen gas larger than a generation amount of the high pressure hydrogen gas.

3. The electrochemical hydrogen compression system according to claim 1, wherein the control device controls a magnitude of the electrical current supplied to the unit cell, so as to make a supply amount of the dry high pressure hydrogen gas larger than a generation amount of the high pressure hydrogen gas.

4. The electrochemical hydrogen compression system according to claim 1, further comprising:
    a humidifier configured to supply water vapor to the supply pathway via an outlet pathway; and
    an outlet valve provided in the outlet pathway and controlled by the control device;
    wherein in the case that the electrical value exceeds the threshold value when the electrical current is of the predetermined value, the control device controls a degree to which the outlet valve is opened to reduce an amount of the water vapor supplied from the humidifier to the supply pathway, as compared with a case that the electrical value is less than the threshold when the electrical current is of the predetermined value.

5. The electrochemical hydrogen compression system according to claim 1, further comprising:

a humidifier configured to supply water vapor to the supply pathway via an outlet pathway;

an outlet valve provided in the outlet pathway and controlled by the control device;

wherein in the case that the electrical value exceeds the threshold value when the electrical current is of the predetermined value, the control device closes the outlet valve and stops supply of the water vapor to the supply pathway.

6. The electrochemical hydrogen compression system according to claim 4, further comprising a water supply pathway configured to guide the water separated by the gas-liquid separator to the humidifier, from the gas-liquid separator.

7. The electrochemical hydrogen compression system according to claim 5, further comprising a water supply pathway configured to guide the water separated by the gas-liquid separator to the humidifier, from the gas-liquid separator.

* * * * *